Nov. 18, 1947.  F. B. HENRY  2,431,174
MOLD DUMPING APPARATUS
Filed March 20, 1946  2 Sheets-Sheet 1

INVENTOR;
FRED B. HENRY,
BY
ATT'Y.

Nov. 18, 1947.                F. B. HENRY                    2,431,174
                         MOLD DUMPING APPARATUS
                       Filed March 20, 1946          2 Sheets-Sheet 2
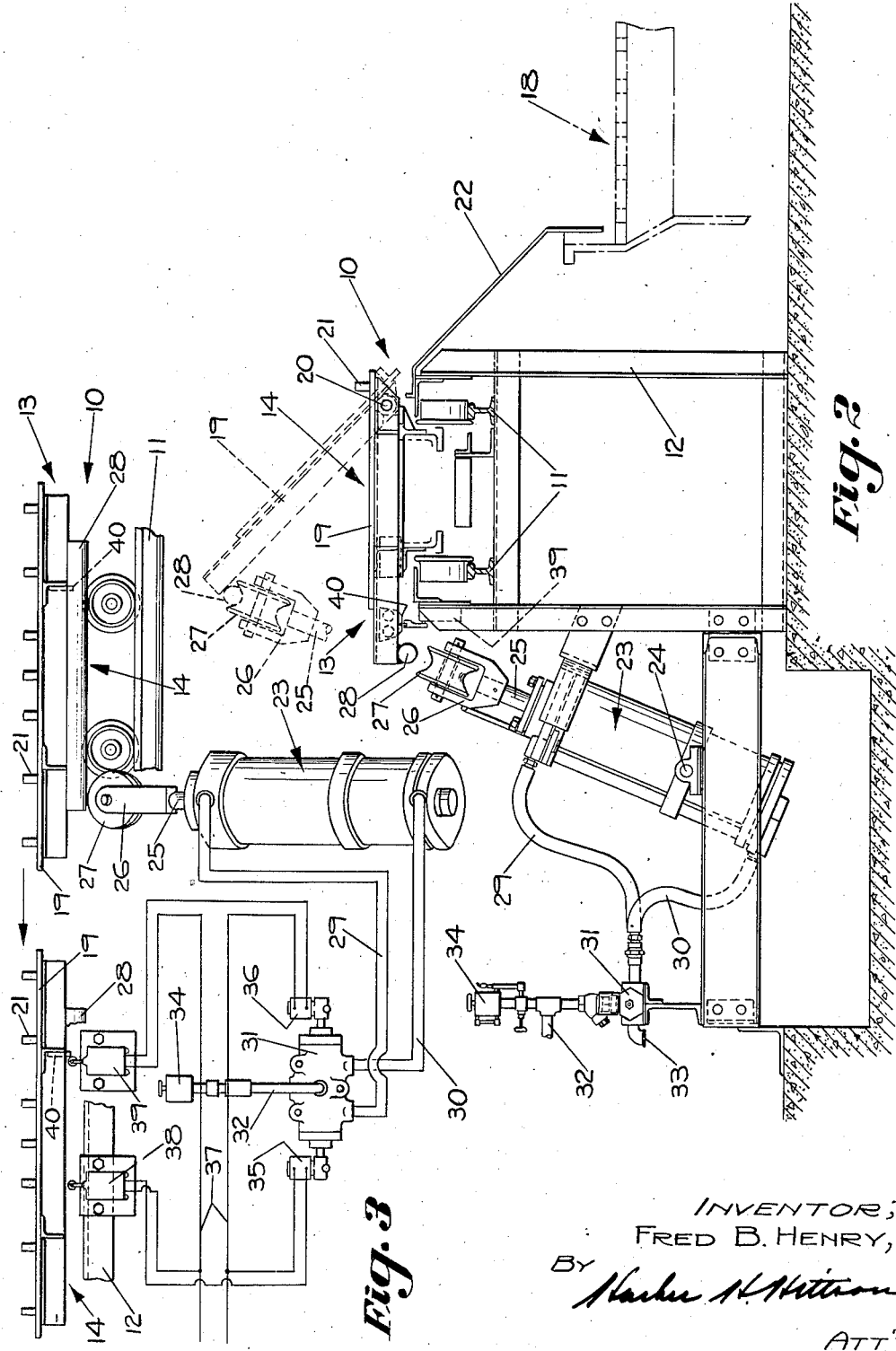
INVENTOR;
FRED B. HENRY,
BY
ATT'Y.

Patented Nov. 18, 1947

2,431,174

UNITED STATES PATENT OFFICE 2,431,174

MOLD DUMPING APPARATUS

Fred B. Henry, Columbus, Ohio, assignor to The Jeffrey Manufacturing Company, a corporation of Ohio Application March 20, 1946, Serial No. 655,749

4 Claims. (Cl. 214—62)

This invention relates to a conveyer and more particularly to an improved mold conveyer for use in a foundry.

An object of the invention is to provide an improved conveyer of the above mentioned type and particularly one in which there is improved mechanism for tilting the mold-carrying pallet or platform of the individual cars of a mold conveyer or otherwise removing the molds from the cars when they reach a predetermined position by hydraulic or other power operated mechanism which when once initiated continues to effect the mold removing operation independently of the travel of the mold conveyer.

Another object of the invention is to provide improved means and more specifically a power operated air cylinder for removing molds from a mold conveyer.

Other objects of the invention will appear hereinafter, the novel features and combinations being set forth in the appended claims.

In the accompanying drawings,

Fig. 2 is a transverse sectional view showing particularly the mechanism for dumping or removing a mold adjacent a predetermined position, such as a shake-out position; and Fig. 3 is a somewhat diagrammatic illustration of the mechanism for dumping the mold, including the control means therefor.

Figure 1:
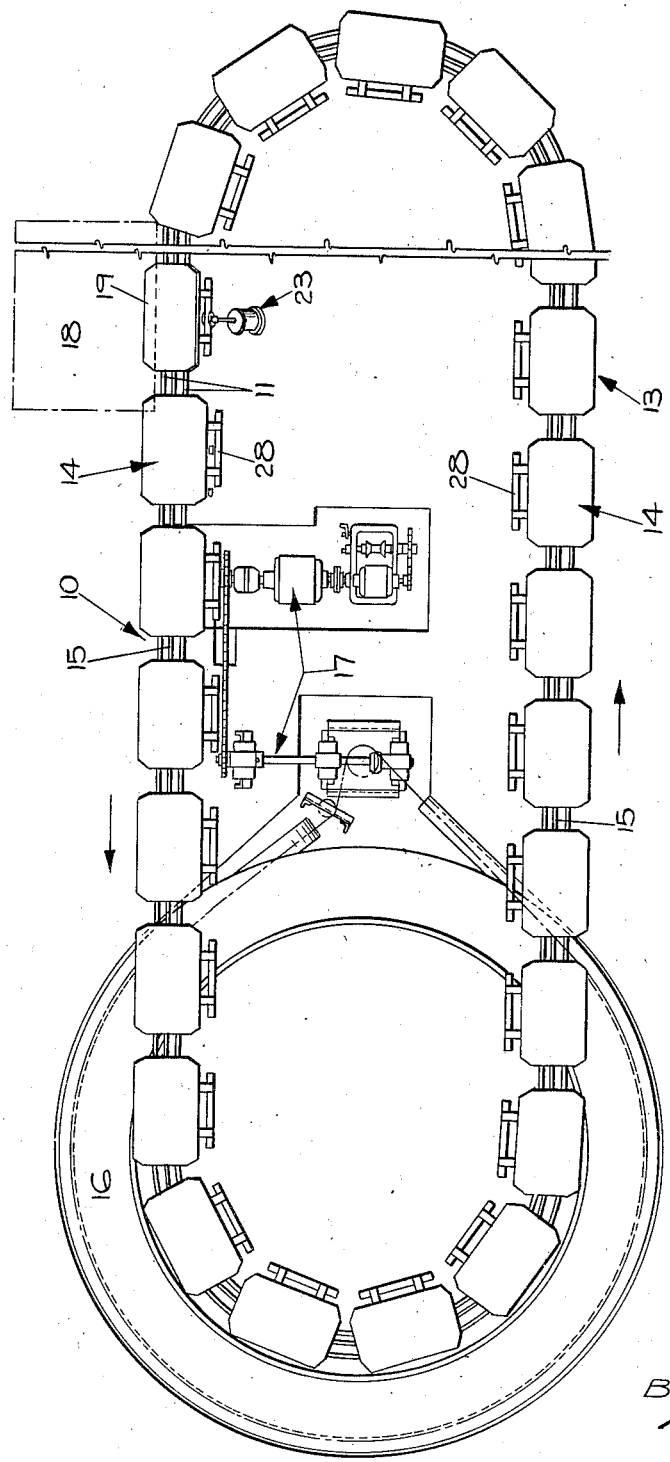
Fig. 1 is a plan view of one form of mold conveyer system incorporating the features of my invention.

The foundry mold conveyer system illustrated in Fig. 1 of the drawings in many of its particulars may follow that disclosed in the patent to Alexis W. Lemmon, No. 1,973,005, dated September 11, 1934, for Conveyer Mechanism, and unless a contrary fact is indicated the conveyer mechanism is to be understood as following the structure disclosed in detail in said patent.

Briefly described, the conveyer mechanism, which is indicated generally by the reference character 10, includes an endless oblong track formed by a pair of spaced rails 11 supported on an appropriate frame 12 (see Fig. 2). Mounted on the endless track 11 for travel therealong is an endless conveyer 13 which includes a plurality of individual cars 14 which are coupled together by coupling means 15 which is disclosed more in detail in the above mentioned Patent 1,973,005.

A workman's rotating platform 16 is located adjacent one of the semi-circular ends of the conveyer mechanism 10 so that molders may prepare molds on the individual cars 14 in an efficient manner. A motor driving mechanism 17 is provided to drive the endless conveyer 13 and the platform 16.

Adjacent one position of the conveyer mechanism 10 there is a shake-out screen or other receptacle 18 which is adapted to receive the individual molds as they are dumped from the conveyer 13, as hereinafter described, and to shake out sand from the castings and flasks.

A particular feature of the invention is the provision of improved mechanism for dumping the molds or flasks on to the shake-out or receptacle 18. To this end, each of the cars 14 is provided with a pivoted pallet or platform 19 which is pivotally mounted at 20 adjacent the outer edge thereof with respect to the frame of the car 14 of which it is a part along a horizontal longitudinally extending axis. By virtue of this fact it is possible to tilt the platform or pallet 19 to discharge a mold or flask or anything else which is resting thereon, by swinging it to the dotted line position as illustrated in Fig. 2 of the drawings.

As clearly illustrated in Figs. 2 and 3 of the drawings, the outer edge of each platform or pallet 19 may be provided with upstanding lugs 21 to prevent inadvertent discharge of mold bottom boards, but which will permit the ready discharge of the molds and castings on to the shake-out or receptacle 18 over a guide chute 22 whenever the platform 19 is swung upwardly to the discharge position illustrated in dotted lines in Fig. 2.

To effect this swinging movement I provide a power operated reciprocal motor, preferably a fluid or air cylinder motor 23, the cylinder of which is preferably mounted in trunnions 24 about a supporting portion of the frame 12. The air cylinder motor 23 includes a piston rod 25 having a bifurcated head 26 which carries a grooved roller 27. Grooved roller 27 is adapted to contact a short rod carried on the inner and lower edge of the platform 19 which is adjacent the discharging position at the time the cylinder 23 is expanded as hereinafter explained more completely. That is, each platform 19 carries a rod 28 on its inner edge which moves rectilinearly in a horizontal plane as it passes the air cylinder 23 and in case the air cylinder 23 is actuated or expanded, the roller 27 contacts the rod 28 and swings the platform 19 to discharge position, as illustrated in dotted lines in Fig. 2.

An important feature of the invention is that the air motor 23 has its cylinder pivotally mounted near its bottom at a position below a horizontal plane passing through the tilting tops or platforms 19 and the entire piston motor is below this plane and generally laterally located with respect to the conveyor 13. Furthermore, once the reciprocating motor 23 is energized it determines its tilting operation and the return of the tilting table 19 through power which is independent of the motive power for the conveyor 13. Also, as a platform 19 swings upwardly, the piston rod 25 of the motor 23 is continuously in a plane below the plane of the platform 19 which swings during this tilting operation. The positioning of the motor 23 below the plane of the tables 19, of course, eliminates any interference with direct access to a mold on a platform and makes possible overhanging molds and mold bottom boards without interfering with the travel of the conveyor 13.

Expansion or contraction of the cylinder 23 is effected as follows. Said cylinder is of the double acting type so that there is an air or fluid line, pipe or conduit 29 leading to the piston rod end thereof, and a similar fluid line, pipe or conduit 30 leading to the head end thereof from a double acting control valve 31. A source of air or other fluid under pressure is provided which leads to the valve 31 by way of pipe or conduit 32. Valve 31 is also provided with an exhaust line or conduit 33. A drip lubricator 34 may also be provided in the pressure line or pipe 32.

Valve 31 is operated in reverse directions by a pair of solenoids 35 and 36. The solenoids 35 and 36 are selectively energized from a power line 37 under the control of switches 38 and 39, respectively. Switches 38 and 39 are spaced along a horizontal member of the frame 12 and are located ahead of the air cylinder 23 when considered in the direction of travel of the conveyer, as indicated by the arrows in Figs. 1 and 3 of the drawings.

Each car 14 carries a removable switch actuating plate 40 which is so positioned that when it is carried by the car 14 it will actuate the actuating arm of the switches 39 and 38 in that order. By the simple expedient of removing an actuating plate 40 from a car 14 the following car will not be dumped because the switches 38 and 39 will not be actuated. Thus the operator can select the cars which are to be actuated or not by attaching or removing the actuating plates 40, and each actuating plate 40 controls the dumping or non-dumping action of the following car 14.

Assuming that the conveyer 13 is traveling in the direction of the arrows seen in Figs. 1 and 3 and carrying molds which have been poured to form castings, which molds and formed castings have had adequate time to cool so as to solidify the castings, and it is desired to dump the molds or flasks together with the castings onto the receptacle or shake-out 18, the operation of the power operated dumping or discharging mechanism will be as follows. As the left-hand car 14, as viewed in Fig. 3 of the drawings, reaches the position there illustrated it will contact the operating lever of switch 39 and thereafter will actuate said switch 39. This will energize solenoid 36 which will control valve 31 so as to deliver fluid under pressure from pipe or conduit 32 to pipe or condut 30 which will initiate the expansion of the cylinder 23. Once this expansion is started and by the actuation of valve 31 it is not necessary to keep the switch 39 closed because the valve 31, which is of standard well-known construction, is such that it remains in any position to which it is shifted by solenoids 35 or 36 until the other of these solenoids actuates it to change its position. Consequently, since the conveyer 13 has initiated the expansion of the cylinder 23 by tripping the switch 39 this expansion will continue under power, which is entirely independent of the driving power of the conveyor 13, to tilt the platform 19 and discharge the mold onto the receptacle or shake-out 18.

The operating time of the cylinder 23 is such that the mold will be completely discharged before the conveyer 13 has traveled a sufficient distance so that actuating plate 40 actuates switch 38 and when this operation takes place solenoid 35 will be energized to reverse the valve 31 and connect the fluid pressure from conduit 32 to conduit 29 which will contract the cylinder 23. The valve 31 also provides for discharge of the cylinder 23 for reverse movements thereof by way of discharge or exhaust line 33.

With the cylinder 23 returned to its contracted position, as illustrated in full lines in Figs. 2 and 3, the system is obviously ready to repeat the above described cycle to tilt the platform 19 of a succeeding car 14 which has been selected for discharge.

In the preferred embodiment of my invention the cylinder 23 tilts the platform 19, but in certain broader aspects of the invention it is to be understood that other arrangements may be provided, whereby said cylinder 23 or power operated mechanism removes the molds from the cars. As one illustration of this, the lugs 21 might be omitted and the platforms 19 formed rigid with the truck or frame of the cars 14 and the cylinder 23 placed substantially horizontal at an elevation near that of the platform 19. Under such conditions, upon the expansion of the cylinder 23, the roller 27 would contact the side of a mold and simply slide it off the platform 19. This modification is suggested primarily to indicate the generic character of my invention in some of its broader aspects, it being understood, however, that the preferred embodiment is that illustrated in the drawings.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. A mold conveyer including an endless conveyer having cars with tilting platforms adapted to support molds, means for tilting said platforms at a selected position, said means including a power device operable when once initiated to tip a selected platform independently of the movement of said endless conveyor, said power device including an air cylinder mechanism and control means for expanding and contracting it, said control means including actuating mechanism for said cylinder, at least part of which is carried by said endless conveyer, and means pivotally mounting said air cylinder laterally of said conveyer and below said platforms.

2. A mold dumping system which comprises a continuously moving conveyer, mold supports carried by said conveyer and movable relative thereto, a roller element positioned adjacent the conveyer to permit the mold supports to successively pass over the same, and means for moving the roller element upwardly and over the conveyer to tilt a mold support to discharge a mold therefrom and then return the roller element back to the side of the conveyer and gradually lower the emptied mold support to seat the same on the conveyer as the mold support passes off of the roller element, said means including a fluid operated cylinder positioned below a horizontal plane through the tops of said mold supports.

3. A mold dumping system comprising a continuously movable conveyer, mold supports carried on said conveyer and movable relative thereto, and reciprocal dumping means movable transversely of the moving conveyer to successively dump and lower each of the mold supports during the period of travel of a mold support over the dumping means, said dumping means being located below a horizontal plane through the tops of said mold supports.

4. A mold conveyer including an endless conveyer having cars with tilting platforms adapted to support molds, and means for tilting said platforms at a selected position, said means including a power device operable when once initiated to tip a selected platform independently of the movement of said endless conveyer, said power device including an air cylinder mechanism and control means for expanding and contracting it, said control means including actuating mechanism for said cylinder mechanism, at least part of which is carried by said endless conveyer, said air cylinder mechanism being located below a horizontal plane through the tops of said platforms.

FRED B. HENRY.

REFERENCES CITED

The following references are of record in the file of this patent:

UNITED STATES PATENTS

| Number | Name | Date |
|---|---|---|
| 772,569 | Kling | Oct. 18, 1904 |
| 1,513,576 | Benbow | Oct. 28, 1924 |
| 1,940,732 | Schmohl | Dec. 26, 1933 |
| 2,277,455 | Rexford | Mar. 24, 1942 |